(12) United States Patent
Izawa

(10) Patent No.: US 10,295,084 B2
(45) Date of Patent: May 21, 2019

(54) CLIP DEVICE

(71) Applicant: Sumitomo Wiring Systems, Ltd., Yokkaichi, Mie (JP)

(72) Inventor: Katsutoshi Izawa, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 45 days.

(21) Appl. No.: 15/382,464

(22) Filed: Dec. 16, 2016

(65) Prior Publication Data

US 2017/0175932 A1    Jun. 22, 2017

(30) Foreign Application Priority Data

Dec. 18, 2015 (JP) .................................. 2015-247034

(51) Int. Cl.
| | |
|---|---|
| F16L 3/10 | (2006.01) |
| F16L 3/237 | (2006.01) |
| F16L 3/223 | (2006.01) |
| B60R 16/02 | (2006.01) |

(52) U.S. Cl.
CPC ........... *F16L 3/1075* (2013.01); *F16L 3/2235* (2013.01); *F16L 3/237* (2013.01); *B60R 16/0215* (2013.01)

(58) Field of Classification Search
CPC ....... F16L 3/1075; F16L 3/105; F16L 3/1211; F16L 3/2235; F16L 3/237; F16L 3/10; F16L 3/1008; F16L 3/18; B60R 16/0215; Y10T 24/44274; F16B 2/245; F16B 7/0433; F16B 21/073; F16B 2/24; F16B 2/241

USPC ............... 248/74.2, 68.1; 403/186, 389, 396
See application file for complete search history.

(56) References Cited

U.S. PATENT DOCUMENTS

| | | | | |
|---|---|---|---|---|
| 5,257,768 A | * | 11/1993 | Juenemann | F16L 55/035 248/604 |
| 5,367,750 A | * | 11/1994 | Ward | F16L 3/12 24/16 PB |
| 7,172,162 B2 | * | 2/2007 | Mizukoshi | B60H 1/00557 248/49 |
| 7,201,352 B2 | * | 4/2007 | Kawai | F16L 3/1075 24/543 |
| 7,770,850 B2 | * | 8/2010 | Allmann | F16L 3/2235 248/65 |
| 8,757,562 B2 | * | 6/2014 | Fujiwara | B60R 16/0215 24/16 PB |
| 8,979,039 B2 | | 3/2015 | Shiga | |
| 9,416,896 B1 | * | 8/2016 | Kato | F16L 3/222 |
| 2005/0253033 A1 | * | 11/2005 | Mizukoshi | B60H 1/00557 248/229.23 |

(Continued)

FOREIGN PATENT DOCUMENTS

JP        2013059188 A      3/2013

*Primary Examiner* — Ingrid M Weinhold

(74) *Attorney, Agent, or Firm* — Reising Ethington, P.C.

(57) ABSTRACT

A clip device that can be fixed to and detached from a pipe as desired. A clip main body is provided with insertion holes into which pipes can be inserted, and elastic holding pieces that face the insertion holes. A bracket is separate from the clip main body and can be attached to and detached from the clip main body. The bracket is provided with an attachment portion that can be attached to a body (vehicle), and pressing portions that press the elastic holding pieces against the outer circumferences of the pipes in the state where the bracket has been assembled together with the clip main body.

4 Claims, 7 Drawing Sheets

(56) References Cited

U.S. PATENT DOCUMENTS

| | | | |
|---|---|---|---|
| 2005/0284989 A1* | 12/2005 | Mizukoshi | F16L 3/2235 248/65 |
| 2012/0015531 A1* | 1/2012 | Chiba | H01R 12/675 439/76.2 |
| 2012/0037402 A1* | 2/2012 | Kawase | H01R 4/2433 174/135 |
| 2012/0220153 A1* | 8/2012 | Okabe | H01R 4/2433 439/395 |
| 2013/0092803 A1* | 4/2013 | Fujiwara | B60R 16/0215 248/74.2 |
| 2014/0374545 A1* | 12/2014 | Sakai | H01R 4/2433 248/68.1 |
| 2015/0214709 A1* | 7/2015 | Landry | H02G 3/32 248/74.2 |

* cited by examiner

CLIP DEVICE

This application claims the benefit of Japanese Application No. JP2015-247034, filed on Dec. 18, 2015, the contents of which are hereby incorporated by reference in their entirety.

FIELD

The present invention relates to a clip device.

BACKGROUND

JP 2013-59188A discloses a clamp for fixing a pipe to a vehicle body. This clamp has a through-hole through which the pipe is inserted, and an attachment hole that accommodates a stud bolt protruding from the vehicle body, and a portion of a partition wall that separates the through-hole from the attachment hole is a swinging piece. In the state where the stud bolt is not accommodated in the attachment hole, the pipe and the clamp can freely undergo relative movement in the axial direction of the pipe. Accordingly, the positioning of the pipe relative to the vehicle body and the positioning of the clamp relative to the vehicle body can be performed independently up until the pipe is fixed to the vehicle body, and thus operability is favorable.

Then, once the pipe and the clamp have been positioned relative to the vehicle body, the stud bolt is fitted into the attachment hole. When the stud bolt is inserted into the attachment hole, the stud bolt pushes the swinging piece toward the pipe, and the swinging piece presses against the outer circumference of the pipe. Relative movement of the pipe and the clamp is restricted by the effect of this pressure, and thus the pipe is fixed relative to the vehicle body.

With the above-described clamp, unless the stud bolt integrated with the vehicle is inserted into the attachment hole of the clamp, the pipe and the clamp can move relative to each other at any time. For this reason, in a case such as carrying the pipe by hand while it has been inserted into the clamp, the position of the clamp is not fixed relative to the pipe, and thus the operability is poor.

The present design was achieved in light of the above situation, and an object thereof is to provide a clip device that can be fixed to a pipe and detached therefrom as desired.

SUMMARY

A clip device according to one aspect of the present design includes:

a clip main body; an insertion hole that is formed in the clip main body and allows insertion of a pipe; an elastic holding piece that is formed on the clip main body so as to face the insertion hole, and is capable of undergoing elastic flexure in a direction of approaching a center of the insertion hole; a bracket that is a part separate from the clip main body and can be attached to and detached from the clip main body; an attachment portion that is formed on the bracket and can be attached to a vehicle; and a pressing portion that is formed on the bracket and presses the elastic holding piece against an outer circumference of the pipe in a state where the bracket is assembled together with the clip main body.

When the bracket is assembled together with the clip main body, the pressing portion presses the elastic holding piece against the outer circumference of the pipe, and thus the clip device and the pipe are fixed to each other. When the bracket is to be detached from the clip main body, the pressing of the elastic holding piece against the pipe is canceled, and thus the clip device and the pipe can undergo relative movement. According to the present design, even in the state where the pipe has not been attached to the vehicle, the pipe and the clip device can be fixed to each other and detached from each other as desired.

DRAWINGS

DESCRIPTION

Figure 1:
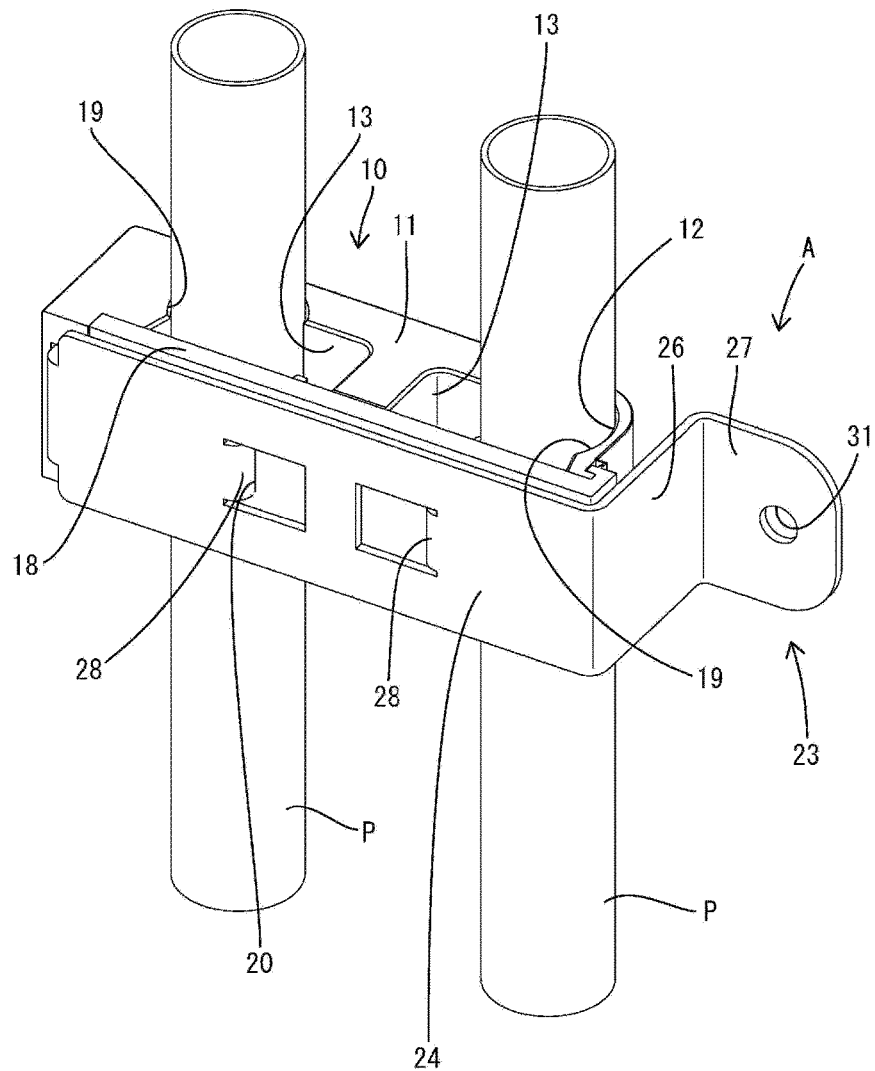
FIG. 1 is a perspective view of a state in which a clip device according to a first embodiment is holding pipes whose axes are oriented in the up-down direction.
Figure 2:
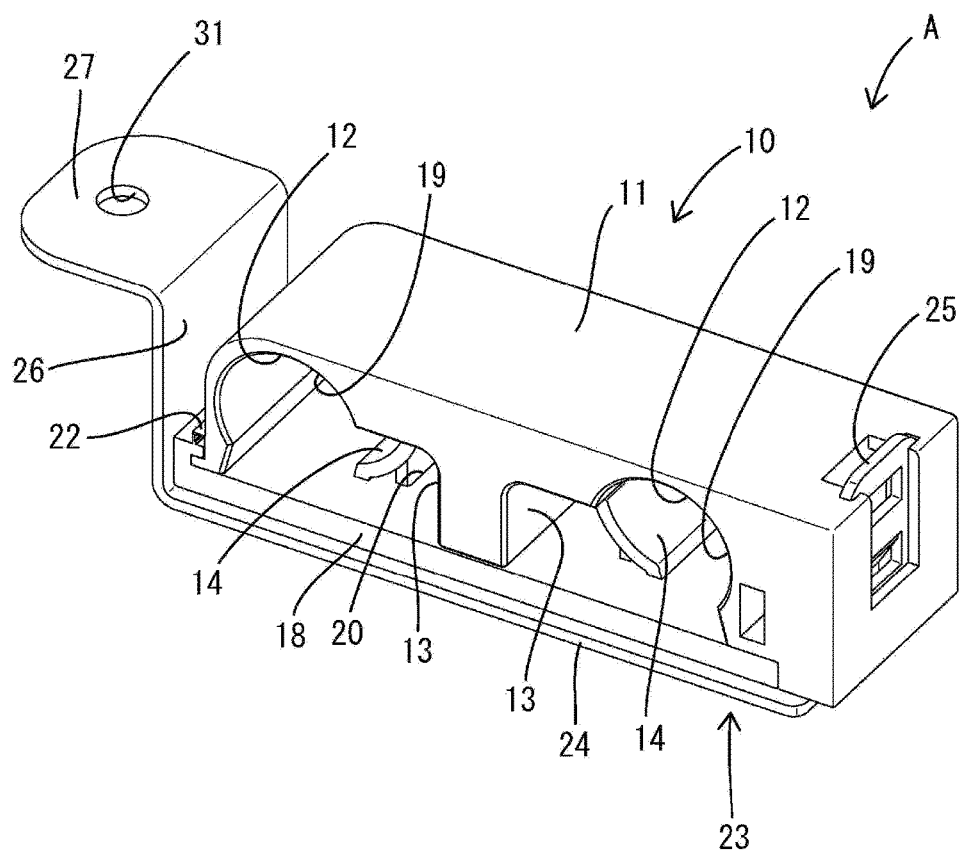
FIG. 2 is a perspective view of a state in which a bracket has been properly assembled together with a clip main body.
Figure 3:
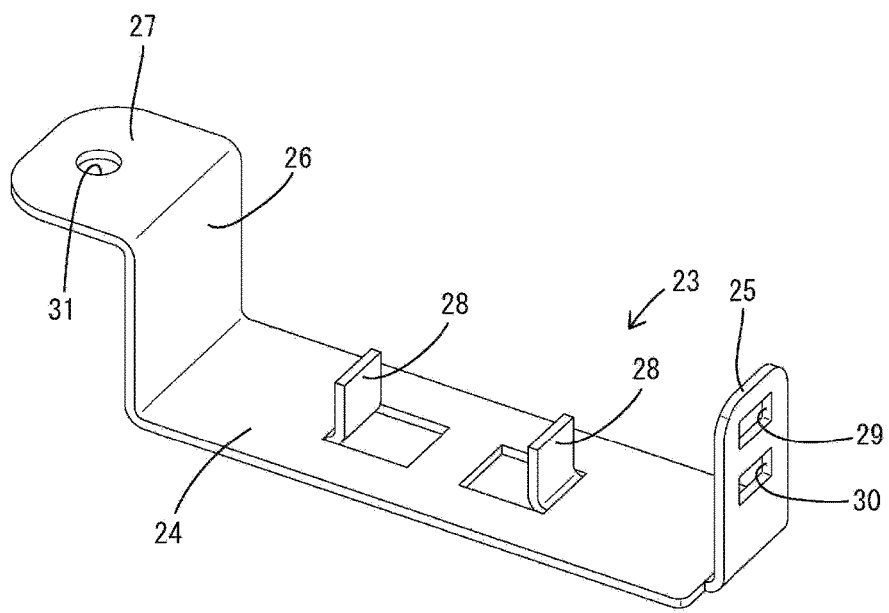
FIG. 3 is a perspective view of the bracket.
Figure 4:
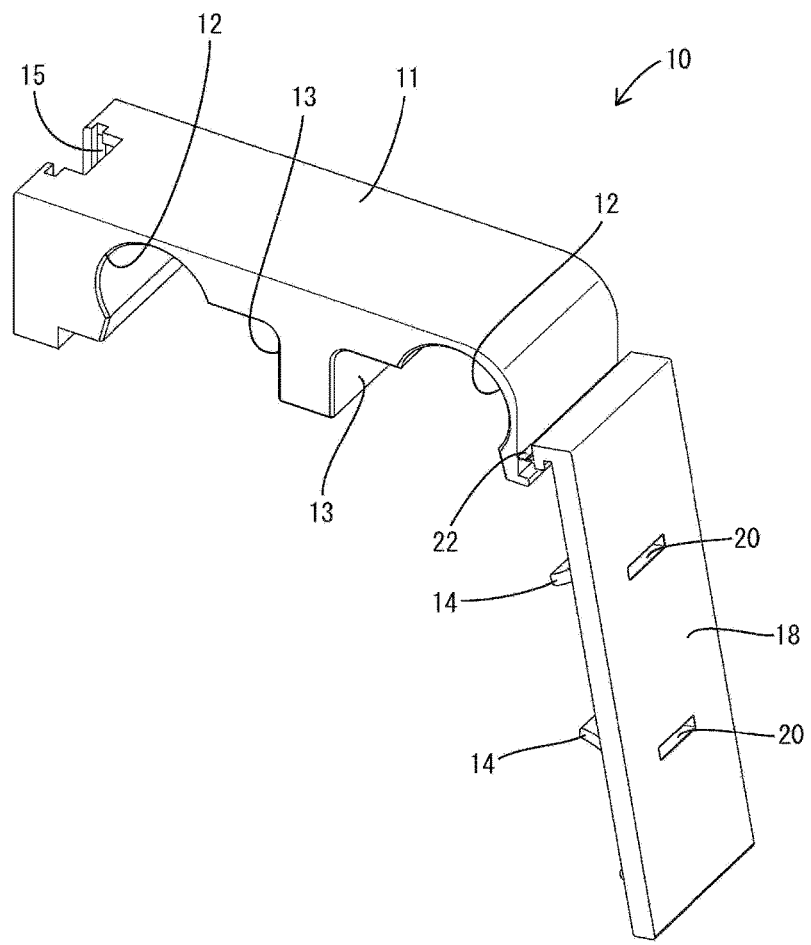
FIG. 4 is a perspective view of a vertically inverted state before a bottom plate portion has been joined to a holding portion that constitutes the clip main body.
Figure 5:
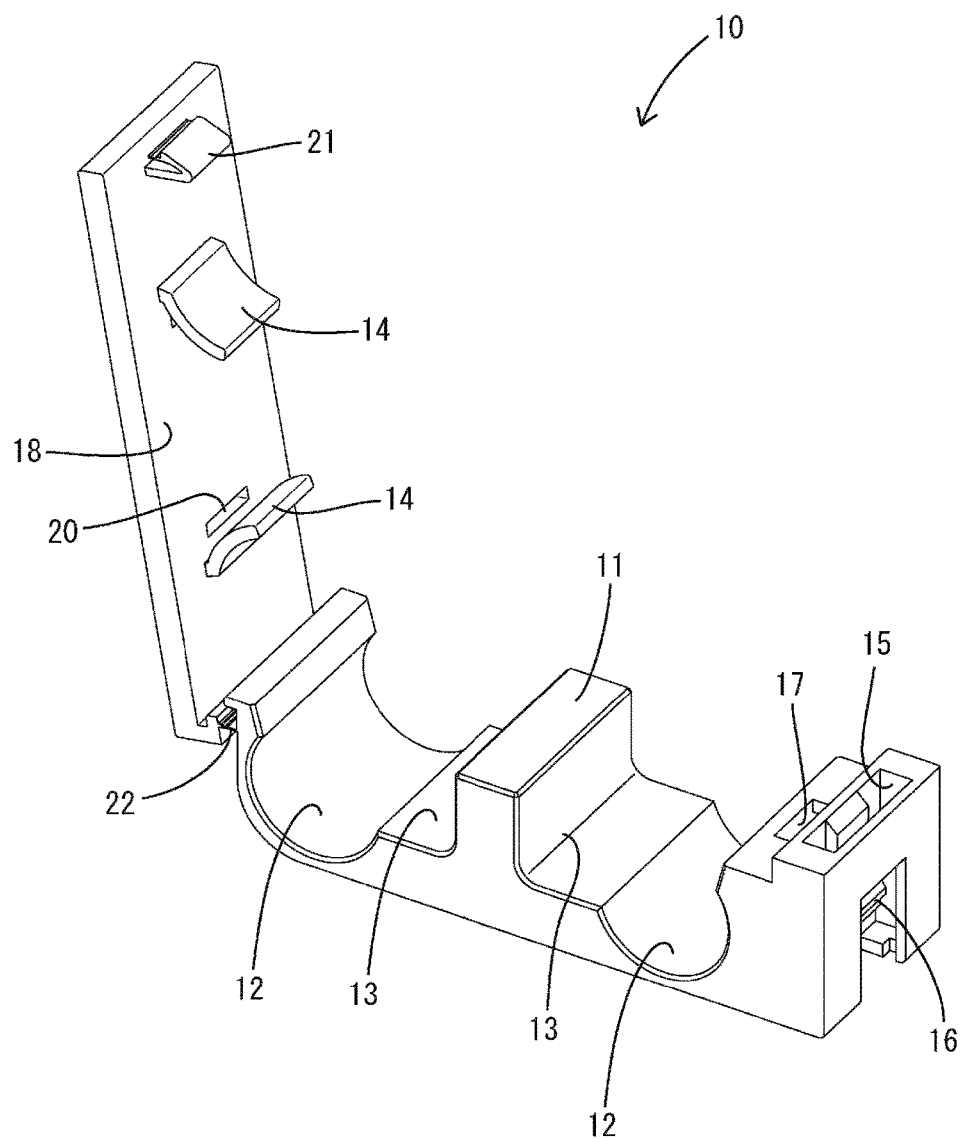
FIG. 5 is a perspective view of a state before the bottom plate portion has been joined to the holding portion that constitutes the clip main body.

In one aspect of the clip device of the present design, the clip main body and the bracket may be respectively provided with provisional locking portions that, when locked to each other, hold the clip main body and the bracket in a provisionally locked state in which the pressing portion is at a position of not pressing the elastic holding piece. According to this configuration, even in the state where the clip device and the pipe can undergo relative movement, the bracket can be provisionally locked to the clip device, thus eliminating the risk of losing the bracket, and eliminating the need to store the bracket separately or the like.

In another aspect of the clip device of the present design, an outer circumference of the elastic holding piece may have a circular arc shape, the pressing portion may be able to press the outer circumference of the elastic holding piece in a direction inclined relative to a tangential direction, and a guide portion that restricts inclination of the pressing portion may be formed in the clip main body. According to this configuration, the pressing portion can reliably press the elastic holding piece.

First Embodiment

Hereinafter, a first embodiment will be described with references to FIGS. 1 to 7. A clip device A of the present embodiment has a function of a means for attaching two pipes P to an automobile body B (recited as a "vehicle" in the claims). The clip device A is configured by assembling together a clip main body 10 and a bracket 23. The pipes P are exterior bodies for both shielding and protecting power lines and the like in a hybrid automobile, for example. The pipes P may be made of a metallic material, a resin material, or both of these materials.

In the following description, the terms "upward direction" and "downward direction" refer to directions shown in FIGS. 2, 3, 6, and 7, and the terms "up" and "down" are defined in the same manner. Also, the terms "leftward direction" and "rightward direction" refer to directions shown in FIGS. 2, 3, 6, and 7, and the terms "left" and "right" are defined in the same manner.

The clip main body 10 is made of a synthetic resin, and is a unified part obtained by coupling together a holding portion 11 and a bottom plate portion 18 using a hinge portion 22. When the holding portion 11 and the bottom plate portion 18 are joined together by relatively rotating them while deforming the hinge portion 22 and using the hinge portion 22 as the fulcrum, the clip main body 10 is in a mode of being capable of holding the pipes P.

The holding portion 11 has an overall shape of being elongated in the left-right direction, and a pair of bilaterally symmetrical arc-shaped receding portions 12 are respectively formed in left and right end portions of the holding portions 11 such that the lower surfaces thereof have a receding shape. The inner circumferential surfaces of the arc-shaped receding portions 12 have a circular arc shape that extends over a range of 180° or more (an angle of approximately 200°). The left-side arc-shaped receding portion 12 is open in a diagonally downward and rightward direction, and the right-side arc-shaped receding portion 12 is open in a diagonally downward and leftward direction. Also, the arc-shaped receding portions 12 are open on both the front and rear surfaces of the holding portion 11 as well. The radius of curvature of the inner circumferential surfaces of the arc-shaped receding portions 12 is approximately the same as the radius of curvature of the outer circumferential surfaces of the pipes P.

A pair of bilaterally symmetrical insertion spaces 13 are respectively formed in regions of the holding portion 11 that are sandwiched by the left and right arc-shaped receding portions 12 such that the lower surface of the holding portion 11 has a receding shape. In the state where the holding portion 11 and the bottom plate portion 18 have been joined to each other, a left-side escape recession and the left-side insertion space 13 are separated by an elastic holding piece 14 formed on the bottom plate portion 18. A right-side escape recession and the right-side insertion space 13 are also separated by an elastic holding piece 14 that is bilaterally symmetrical with the left-side elastic holding piece 14.

A slit-shaped locking space 15 that passes through the holding portion 11 in the up-down direction is formed in the right end portion of the holding portion 11. The region of the locking space 15 excluding the front and rear edge portions and the lower edge portion is open toward the right outward surface of the holding portion 11. An elastic locking piece 16 (recited as a "provisional locking portion" in the claims) that extends upward in a cantilevered manner is formed in the locking space 15. A retaining hole 17, which is a notch formed in the lower surface of the holding portion 11, is formed in the region of the right end portion of the holding portion 11 that is adjacent to the left side of the locking space 15.

The bottom plate portion 18 is approximately shaped as a flat plate, and the left edge of the bottom plate portion 18 is connected to the left end portion of the holding portion 11 via the hinge portion 22. A pair of bilaterally symmetrical elastic holding pieces 14, which are shaped as plates curved into a circular arc shape, are formed on the upper surface of the bottom plate portion 18. The elastic holding pieces 14 extend diagonally upward from the bottom plate portion 18 in a cantilevered manner. The elastic holding pieces 14 can undergo elastic displacement in the left and right directions with the base end portions (lower end portions connected to the bottom plate portion 18) serving as the fulcrum.

In the state where the holding portion 11 and the bottom plate portion 18 are joined to each other, the left-side elastic holding piece 14 is arranged so as to oppose the inner circumferential surface of the left-side arc-shaped receding portion 12 and so as to form a circular arc that is concentric with the left-side arc-shaped receding portion 12. The radius of curvature of the inner circumferential surface of this holding portion 11 is approximately the same as the inner circumferential surface of the arc-shaped receding portion 12. Also, the right-side elastic holding piece 14 is arranged so as to oppose the inner circumferential surface of the right-side arc-shaped receding portion 12 and so as to form a circular arc that is concentric with the right-side arc-shaped receding portion 12. The radius of curvature of the inner circumferential surface of this holding portion 11 is also approximately the same as the inner circumferential surface of the arc-shaped receding portion 12. The arc-shaped receding portions 12 and the elastic holding pieces 14 of the clip main body 10 constitute the pair of left and right insertion holes 19 that are approximately circular and pass through the clip main body 10 in the front-rear direction. The pipes P are inserted through the insertion holes 19.

A pair of left and right guide holes 20 (recited as a "guide portion" in the claims) are formed in the bottom plate portion 18 so as to pass through the bottom plate portion 18 in the up-down direction (plate thickness direction). In the state where the holding portion 11 and the bottom plate portion 18 are joined to each other, the left-side guide hole 20 is arranged at a position that is overlapped with (a position that corresponds to) the outer circumferential surface of the left-side elastic holding piece 14 in the left-right direction, and the right-side guide hole 20 is arranged at a position that is overlapped with (a position that corresponds to) the outer circumferential surface of the right-side elastic holding piece 14 in the left-right direction.

Furthermore, an elastic retaining piece 21 having a bent shape is formed on the upper surface of the right end portion of the bottom plate portion 18. In the state where the holding portion 11 and the bottom plate portion 18 are joined to each other, the elastic retaining piece 21 is inserted into the retaining hole 17, and a step portion at the tip of the elastic retaining piece 21 and a step portion formed on the inner surface of the retaining hole 17 are locked together. Due to this locking action, the holding portion 11 and the bottom plate portion 18 are held in the joined state, and the clip main body 10 is in a mode of being capable of holding the pipes P.

The bracket 23 is formed by performing bending processing or the like on a metallic plate having a predetermined shape, and is a unified part that is separate from the clip main body 10. The bracket 23 is constituted by a main body portion 24, which is arranged so as to oppose the outer surface (lower surface) of the bottom plate portion 18 when assembled together with the clip main body 10, as well as an assembly portion 25, an extending portion 26, and an attachment portion 27.

A pair of bilaterally symmetrical pressing portions 28 are formed on the main body portion 24. The pressing portions 28 are formed by raising up portions of the main body portion 24. The pressing portions 28 protrude upward from the main body portion 24 at approximately right angles. The pair of pressing portions 28 are positioned so as to correspond to the pair of left and right guide holes 20 of the clip main body 10 in the left-right direction.

The assembly portion 25 extends upward from the right edge of the main body portion 24. A provisional locking hole 29 (recited as a "provisional locking portion" in the claims)

that passes through the assembly portion 25 in the plate thickness direction (left-right direction) is formed in the upper end portion of the assembly portion 25. A main locking hole 30 that passes through the assembly portion 25 in the plate thickness direction (left-right direction) is formed in the assembly portion 25 at a position lower than the provisional locking hole 29.

The extending portion 26 extends upward from the left edge of the main body portion 24 at approximately a right angle in a cantilevered manner. The attachment portion 27 extends leftward from the extending edge (upper edge) of the extending portion 26 in a cantilevered manner. The attachment portion 27 is parallel with the main body portion 24. An attachment hole 31 is formed in the attachment portion 27. The upper surface of the attachment portion 27 is brought into contact with the lower surface of the body B. A bolt 32 for attaching the bracket 23 to the body B passes through the attachment hole 31.

Next, actions of the present embodiment will be described. The clip device A provisionally holds two pipes P. At this time, the bottom plate portion 18 is not joined to the holding portion 11, and the arc-shaped receding portions 12 are open downward with respect to the holding portion 11. The pipes P are fitted into the arc-shaped receding portions 12 in this state. At this time, the formation range of the arc-shaped receding portions 12 extends over 180° or more, and therefore the pipes P fitted into the arc-shaped receding portions 12 are integrated with the holding portions 11 without the need to be supported by hand. It should be noted that each pipe P is capable of relative movement (sliding) relative to the clip main body 10 in the axial direction of the pipe P, and capable of relative rotation about the axis of the pipe P, both while sliding over the inner circumferential surface of the corresponding arc-shaped receding portion 12.

After the pipes P have been held in the arc-shaped receding portions 12, the bottom plate portion 18 is joined to the holding portion 11, and the lower sides of the arc-shaped receding portions 12 and the insertion spaces 13 are blocked by the bottom plate portion 18. When the bottom plate portion 18 is to be joined to the holding portion 11, the elastic holding pieces 14 are in a state of opposing the outer circumferences of the pipes P via a gap. In this state as well, each pipe P is capable of relative movement (sliding) relative to the clip main body 10 in the axial direction of the pipe P, and capable of relative rotation about the axis of the pipe P, both while sliding over the inner circumferential surface of the corresponding arc-shaped receding portion 12.

Figure 6:
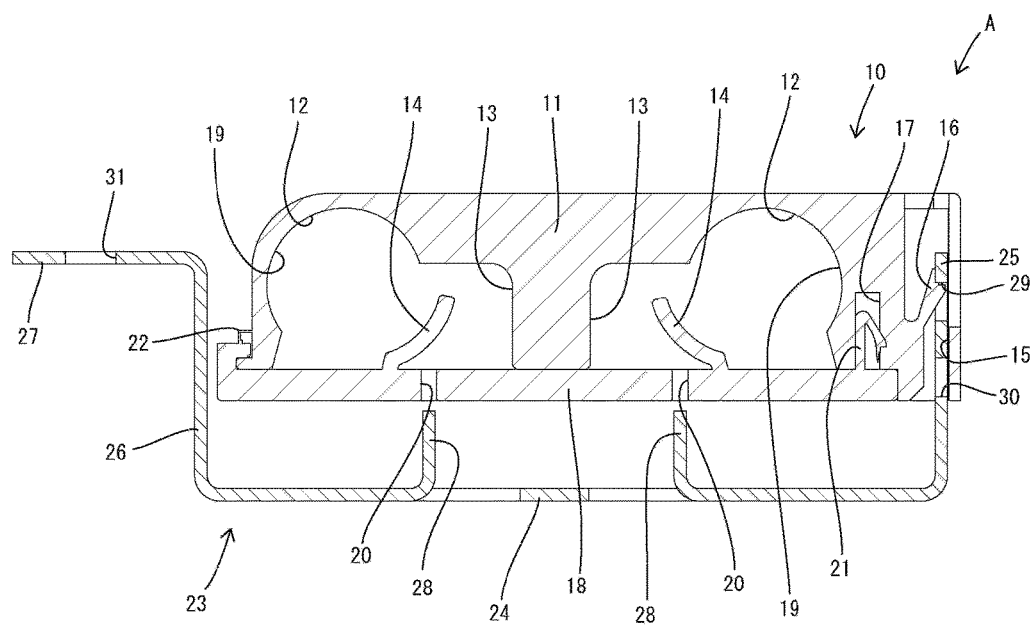
FIG. 6 is a cross-sectional view of a state in which the bracket has been provisionally locked to the clip main body.

After the pipes P have been held in the clip main body 10, the bracket 23 is provisionally locked to the clip main body 10. At the time of provisional locking, the assembly portion 25 of the bracket 23 is inserted into the locking space 15 from below. In the insertion process, the elastic locking piece 16 interferes with the assembly portion 25 and undergoes elastic flexure. Then, when the bracket 23 reaches the provisional locking position, as shown in FIG. 6, the elastic locking piece 16 undergoes elastic restoration and becomes locked with the hole edge of the provisional locking hole 29. Due to this locking action, the bracket 23 is held in a state of being provisionally locked to the clip main body 10.

In the state where the bracket 23 has been provisionally locked, the pressing portions 28 have not been inserted into the guide holes 20. In other words, the pressing portions 28 are not in contact with the elastic holding pieces 14. Accordingly, the clip main body 10 and the pipes P can undergo relative movement in the axial direction, and the pipes P can undergo relative rotation about their axes relative to the clip main body 10.

Figure 7:
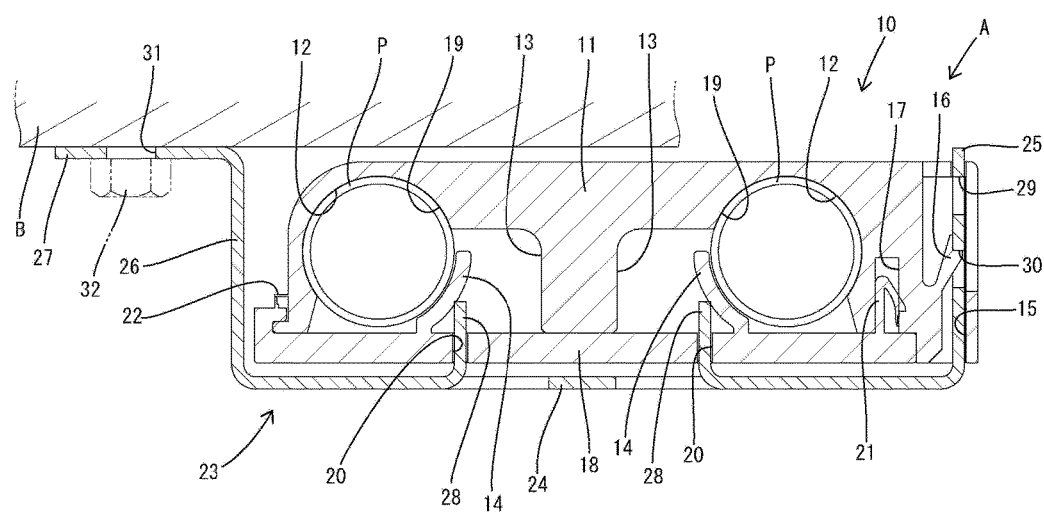
FIG. 7 is a cross-sectional view of a state in which the bracket has been properly assembled together with the clip main body.

After the bracket 23 has been provisionally locked, if the assembly portion 25 is then inserted deeper into the assembly space, the elastic locking piece 16 becomes locked with the main locking hole 30. As shown in FIG. 7, due to this locking action, the bracket 23 is held in a state of being properly assembled together with the clip main body 10. Also, in the process of displacing the bracket 23 from the provisionally locked state to the properly assembled state, the two pressing portions 28 are inserted into the guide holes 20. Also, in the insertion spaces 13, the upper end portions of the pressing portions 28 press against the outer circumferences of the elastic holding pieces 14, and the pressed elastic holding pieces 14 become elastically displaced toward the centers of the insertion holes 19 and firmly press against the outer circumferences of the pipes P.

At this time, the direction in which the pressing portions 28 press the outer circumferences of the elastic holding pieces 14 are not directions tangential to the outer circumferences of the elastic holding pieces 14, but rather are directions inclined relative to the tangential directions. Accordingly, in the pressing process, a large amount of resistance does not occur between the pressing portions 28 and the elastic holding pieces 14. The operability is therefore favorable when displacing the bracket 23 toward the properly assembled state. The elastic holding pieces 14 then firmly press the outer circumferences of the pipes P, and thus the pipes P enter a state of being constricted by the clip device A. Accordingly, the pipes P and the clip device A do not easily undergo relative movement in the axis direction, the pipes P do not easily undergo relative rotation about their axes relative to the clip device A, and the two pipes P and the clamp device are in a state of being fixed together.

In this way, if the pipes P and the clamp device are fixed together, the operability is favorable when transporting the pipes P and the clip device A to the site for assembly with the body B. At the site for assembly with the body B, the bracket 23 is first displaced from the properly assembled state to the provisionally locked state, thus making it possible for the pipes P and the clamp device to undergo relative movement. Doing this makes it possible to independently perform the task of positioning the pipes P in a predetermined routing path and the task of positioning the clip device A at a predetermined attachment position on the body B.

After the pipes P and the clamp device have been positioned, the bracket 23 is again displaced to the properly assembled state, thus fixing together the pipes P and the clamp device. Then the bolt 32, which has been inserted into the attachment hole 31 of the attachment portion 27, is screwed into the body B, and thus the clip device A is fixed to the body B. Accordingly, the two pipes P are attached to the body B via the clip device A.

As described above, the clip main body of the clip device A of the present embodiment includes the clip main body 10 and the bracket 23 that is separate from the clip main body 10 and can be attached to and detached from the clip main body 10. The insertion holes 19 that allow insertion of the pipes P are formed in the clip main body 10. Also, the elastic holding pieces 14, which are arranged so as to face the insertion holes 19 and can undergo elastic flexure in a direction of approaching the centers of the insertion holes 19, are formed in the same clip main body 10. Moreover, the attachment portion 27 that can be attached to the body B, which is the object that the pipes P are to be attached to, is formed on the bracket 23. Furthermore, the bracket 23 is provided with the pressing portions 28 that press the elastic holding pieces 14 against the outer circumferences of the pipes P when the bracket 23 has been assembled together with the clip main body 10.

When the bracket 23 is assembled together with the clip main body 10, the pressing portions 28 press the elastic holding pieces 14 against the outer circumferences of the pipes P, and thus the clip device A and the pipes P are fixed to each other. When the bracket 23 is to be detached from the clip main body 10, the pressing of the elastic holding pieces 14 against the pipes P is canceled, and thus the clip device A and the pipes P can undergo relative movement. In this way, according to the clip device A of the present embodiment, even in the state where the pipes P have not been attached to the attachment target, the pipes P and the clip device A can be fixed to each other and detached from each other as desired.

Also, the elastic locking piece 16 and the provisional locking hole 29 are formed on the clip main body 10 and the bracket 23. When the elastic locking piece 16 and the provisional locking hole 29 are locked together, the clip main body 10 and the bracket 23 are held in a provisionally locked state with the pressing portions 28 at positions that do not press the elastic holding pieces 14. According to this configuration, even in the state where the clip device A and the pipes P can undergo relative movement, the bracket 23 can be provisionally locked to the clip device A, thus eliminating the risk of losing the bracket 23, and eliminating the need to store the bracket 23 separately or the like.

Also, the outer surfaces of the elastic holding pieces 14 have a circular arc shape, and the pressing portions 28 press the outer surfaces of the elastic holding pieces 14 in a direction that is inclined relative to the tangential direction. Also, guide portions that restrict the inclination of the pressing portions 28 are formed in the clip main body 10. According to this configuration, the pressing portions 28 can reliably press the elastic holding pieces 14 and fix the pipes P and the clip device A to each other without generating a large amount of resistance.

Other Embodiments

The present invention is not limited to the embodiment described above using the foregoing description and drawings, and embodiments such as the following are also encompassed in the technical scope of the present invention.

In the above embodiment, in the state where the bracket has been provisionally locked to the clip main body, the pressing portions are not in contact with the elastic holding pieces, but there is no limitation to this, and a configuration is possible in which the pressing portions lightly come into contact with the elastic holding pieces in the provisionally locked state, to the extent that the clip device is not fixed to the pipes.

In the above embodiment, the bracket can be provisionally locked to the clip main body, but a configuration is possible in which such a provisional locking means is not provided, and the mode of attachment of the bracket to the clip main body is merely one mode in which the elastic holding pieces press the pipes.

In the above embodiment, two pressing portions separately press two elastic holding pieces, but a configuration is possible in which one pressing portion presses two elastic holding pieces at the same time.

In the above embodiment, one clip device holds two pipes, but the number of pipes held by one clip device may be one, or three or more.

In the above embodiment, the clip main body is a unified part obtained by relatively displacing and joining the holding portion and the bottom plate portion that are connected via the hinge portion, but the clip main body may be in a mode in which the shape thereof does not change.

In the above embodiment, the clip main body is a unified part, but the clip main body may be constituted by joining separate parts to each other.

In the above embodiment, the pressing portions press the outer circumferences of the elastic holding pieces in a direction inclined relative to the tangential direction, but the pressing portions may press the outer circumferences of the elastic holding pieces in the normal direction.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A clip device comprising:
 a clip main body that has a holding portion, a bottom plate portion and a hinge portion, the holding portion and a first end portion of the bottom plate portion are coupled together by the hinge portion, wherein the holding portion includes a locking portion that is configured to lock with a second end portion of the bottom plate portion, and wherein the second end portion of the bottom plate portion opposes the first end portion of the bottom plate portion;
 an insertion hole that is formed in the clip main body when the holding portion and the second end portion of the bottom plate portion are joined and locked together via rotation of the holding portion around the hinge portion so that the locking portion of the holding portion contacts and locks with the second end portion of the bottom plate portion, the insertion hole allows insertion of a pipe;
 an elastic holding piece that is formed on the clip main body so as to face the insertion hole, and the elastic holding piece is capable of undergoing elastic flexure in a direction approaching a center of the insertion hole;
 a bracket that is a part separate from the clip main body and is configured to be attached to and detached from the clip main body;

an attachment portion that is formed on the bracket and is configured to be attached to a vehicle; and a pressing portion that is formed on the bracket, wherein the pressing portion is configured so that when the bracket is assembled together with the clip main body, the pressing portion presses against the elastic holding piece and urges the elastic holding piece in the direction approaching the center of the insertion hole for pressing against an outer circumference of the pipe when the pipe is inserted in the insertion hole.

2. The clip device according to claim 1, wherein the clip main body and the bracket are respectively provided with provisional locking portions that, when locked to each other, hold the clip main body and the bracket in a provisionally locked state in which the pressing portion is at a position of not pressing the elastic holding piece.

3. The clip device according to claim 1, wherein the elastic holding piece has an arc shape, and a guide portion that restricts inclination of the pressing portion is formed in the clip main body.

4. The clip device according to claim 2, wherein the elastic holding piece has an arc shape, and a guide portion that restricts inclination of the pressing portion is formed in the clip main body.

* * * * *